(12) United States Patent
Wang et al.

(10) Patent No.: US 10,942,591 B2
(45) Date of Patent: Mar. 9, 2021

(54) TOUCH DISPLAY PANEL AND TOUCH DISPLAY DEVICE

(71) Applicant: Shanghai Tianma AM-OLED Co., Ltd., Shanghai (CN)

(72) Inventors: Qingxia Wang, Shanghai (CN); Kaihong Huang, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 0 days.

(21) Appl. No.: 16/574,702

(22) Filed: Sep. 18, 2019

(65) Prior Publication Data

US 2020/0348783 A1    Nov. 5, 2020

(30) Foreign Application Priority Data

Apr. 30, 2019    (CN) .......................... 201910360016.6

(51) Int. Cl.
     *G06F 3/041*      (2006.01)
     *G06F 3/044*      (2006.01)

(52) U.S. Cl.
     CPC .......... *G06F 3/0412* (2013.01); *G06F 3/0445* (2019.05); *G06F 3/0446* (2019.05)

(58) Field of Classification Search
     CPC .... G06F 3/0446; G06F 3/0412; G06F 3/0445; G02F 1/13338
     See application file for complete search history.

(56) References Cited

U.S. PATENT DOCUMENTS

2019/0258108 A1*   8/2019   Xie ...................... G02F 1/13338
2020/0089359 A1*   3/2020   Xu ......................... G06F 3/0446

FOREIGN PATENT DOCUMENTS

CN         109002229 A     12/2018

* cited by examiner

*Primary Examiner* — Abdul-Samad A Adediran
(74) *Attorney, Agent, or Firm* — Tarolli, Sundheim, Covell & Tummino LLP

(57) ABSTRACT

Provided is a touch display panel having a first touch display region and including: first touch electrodes arranged in a plurality of columns in the first touch display region, and extending in a first direction and arranged in a second direction, each first touch electrode including a plurality of first electrode blocks electrically connected to each other, and the first direction intersecting the second direction; and second touch electrodes arranged in a plurality of rows in the first touch display region, and extending in the second direction and arranged in the first direction, each second touch electrode including a plurality of second electrode blocks electrically connected to each other. The plurality of first electrode blocks and the plurality of second electrode blocks are alternately arranged in the first direction.

18 Claims, 9 Drawing Sheets

TOUCH DISPLAY PANEL AND TOUCH DISPLAY DEVICE

CROSS-REFERENCE TO RELATED APPLICATIONS

The present application claims priority to Chinese Patent Application No. 201910360016.6, filed on Apr. 30, 2018, the content of which is incorporated herein by reference in its entirety.

TECHNICAL FIELD

The present disclosure relates to the field of display technologies, and more particularly, to a touch display panel and a touch display device.

BACKGROUND

In the related art, touch panels include a self-capacitive touch panel and a mutual-capacitive touch panel. The self-capacitive touch panel utilizes a self-capacitive touch electrode and a ground electrode to achieve touch control, and the mutual-capacitive touch panel utilizes a touch driving electrode and a touch sensing electrode to achieve touch control. However, the pattern design of the mutual-capacitive touch panel is not flexible.

SUMMARY

In order to solve the above problems, the present disclosure provides a touch display panel and a touch display device.

In one aspect, a touch display panel is provided. The touch display panel has a first touch display region, and includes: first touch electrodes arranged in a plurality of columns in the first touch display region, the first touch electrodes extending in a first direction and being arranged in a second direction, each of the first touch electrodes including a plurality of first electrode blocks electrically connected to each other, and the first direction intersecting the second direction; and second touch electrodes arranged in a plurality of rows in the first touch display region, the second touch electrodes extending in the second direction and arranged in the first direction, each of the second touch electrodes including a plurality of second electrode blocks electrically connected to each other. The plurality of first electrode blocks and the plurality of second electrode blocks are alternately arranged in the first direction.

In another aspect, a touch display panel including the touch display device above is provided.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings without any creative effort.

DESCRIPTION OF EMBODIMENTS

In order to better understand technical solutions of the present disclosure, the embodiments of the present disclosure are described in details with reference to the drawings.

The described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing particular embodiments and not intended to limit the present disclosure. Unless otherwise noted in the context, the singular form expressions "a", "an", "the" and "said" used in the embodiments and appended claims of the present disclosure are also intended to represent a plural form.

It should be understood that the term "and/or" as used herein is merely an association describing the associated object, indicating that there may be three relationships. For example, A and/or B may indicate three cases: only A exists; A and B exist concurrently; only B exists. In addition, a character "/" herein generally indicates that the contextual objects are in an "or" relationship.

It should be understood that although the terms first, second, etc. may be used to describe devices in the embodiments of the present disclosure, these devices should not be limited to these terms. These terms are only used to distinguish devices from one another. For example, a first device could also be termed a second device, and similarly, a second device could also be termed a first device without departing from the scope of the embodiments of the present disclosure.

Figure 1:
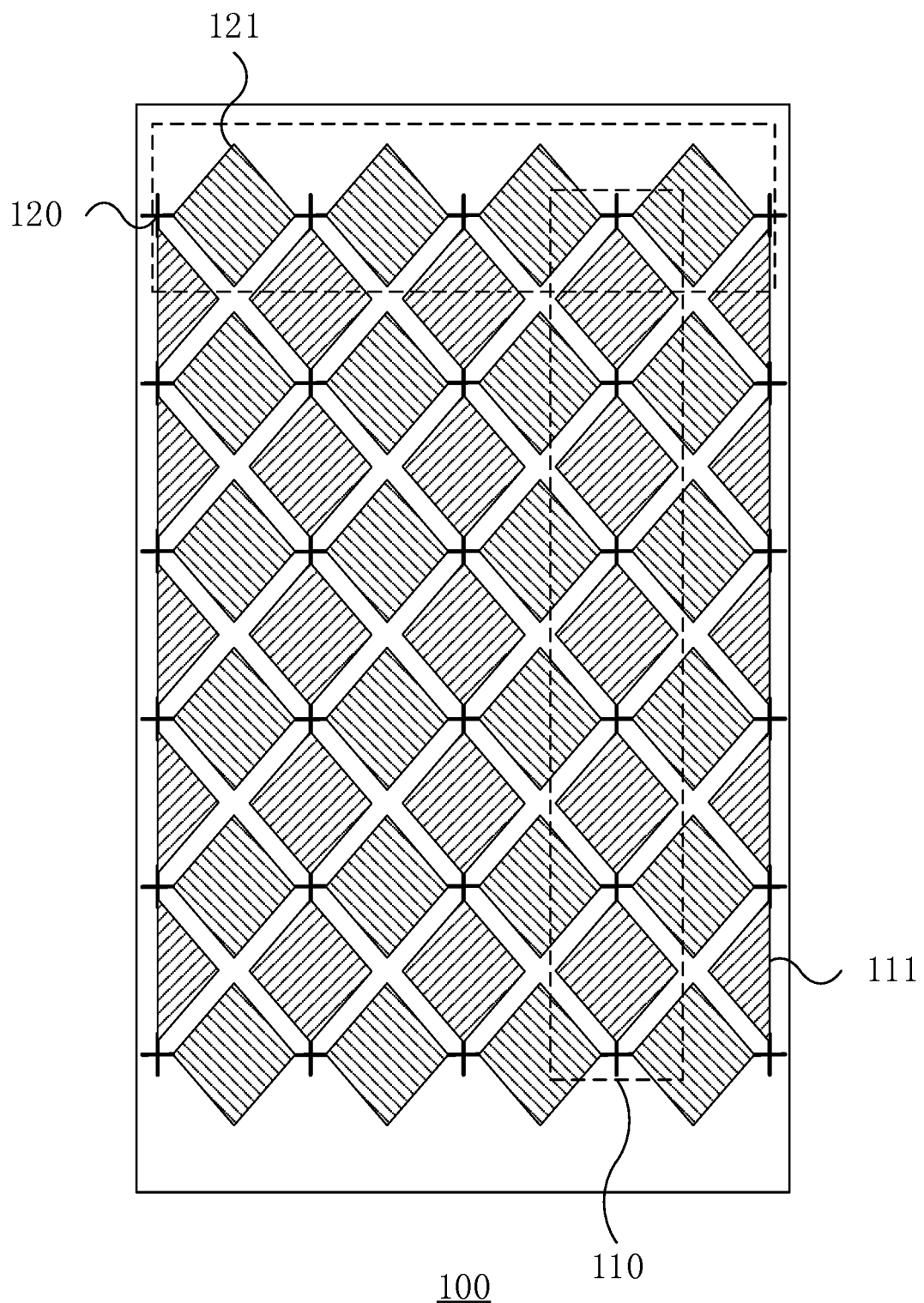
FIG. 1 illustrates a structural schematic diagram of a touch display panel 100 in the related art.

FIG. 1 illustrates a structural schematic diagram of a touch display panel 100 in the related art.

As shown in FIG. 1, in the related art, the touch display panel 100 includes a touch driving electrode 110 and a touch sensing electrode 120. The touch driving electrode 110 includes a touch driving electrode block 111. The touch sensing electrode 120 includes a touch sensing electrode block 121. In each column of the touch driving electrode 110, the left side and the right side of two adjacent touch driving electrode blocks 111 are respectively provided with one touch sensing electrode block 121. There is substantially no space in the left side and the right side of the two adjacent touch driving electrode blocks 111, so that the two adjacent touch driving electrode blocks 111 cannot be electrically connected by taking advantages of space on the left side or the right side. Thus, the pattern design of the touch driving electrode 110 is not flexible.

In order to solve the above technical problems, the present disclosure provides a touch display panel and a touch display device.

Figure 2:
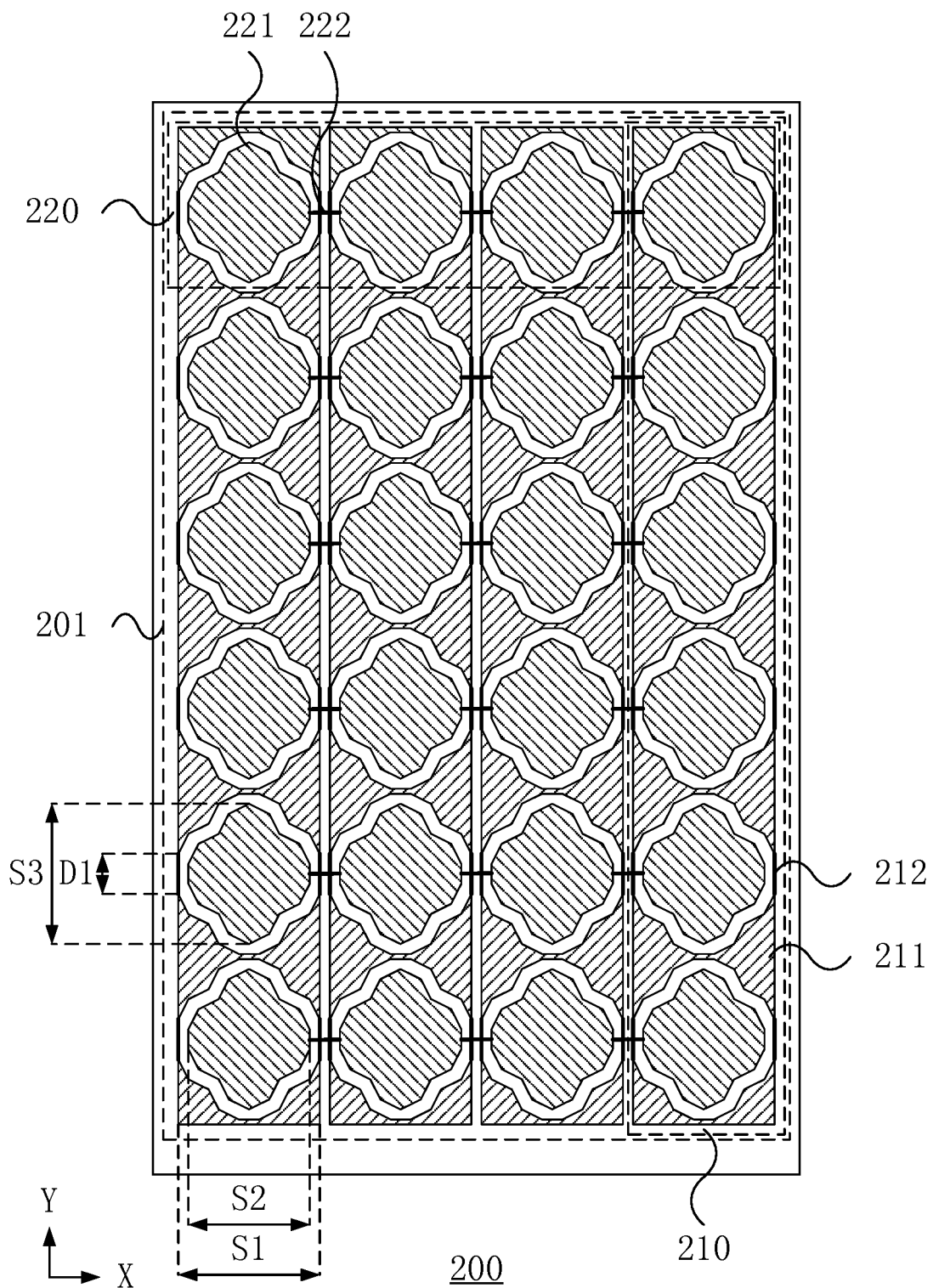
FIG. 2 illustrates a structural schematic diagram of a touch display panel 200 according to an embodiment of the present disclosure.

FIG. 2 illustrates a structural schematic diagram of a touch display panel 200 according to an embodiment of the present disclosure.

As shown in FIG. 2, the touch display panel 200 includes a first touch display region 201. The first touch display region 201 includes multiple columns of first touch electrodes 210 extending in a first direction Y and arranged in a second direction X. Each column of the first touch electrode 210 includes multiple first electrode blocks 211 electrically connected to each other. The first direction Y intersects the second direction X. The first touch display region 201 further includes multiple rows of second touch electrodes 220 extending in the second direction X and arranged in the first direction Y. Each row of the second touch electrode 220 includes multiple second electrode blocks 221 electrically connected to each other. The first electrode blocks 211 and the second electrode blocks 221 are alternately arranged in the first direction Y.

In the embodiment of the present disclosure, in the first touch display region 201, the multiple columns of the first touch electrodes 210 extend in the first direction Y and are arranged in the second direction X. The multiple rows of the second touch electrodes 220 extend in the second direction X and are arranged in the first direction Y. Any one of the multiple columns of the first touch electrodes 210 intersects with any one of the multiple rows of the second touch electrodes 220 to form a mutual capacitance. Each column of the first touch electrode 210 is respectively electrically connected to a touch chip, and the touch chip respectively transmits touch driving signals to each column of the first touch electrode 210. Each row of the second touch electrode 220 is respectively electrically connected to the touch chip, and the touch chip respectively detects touch sensing signals of each row of the second touch electrode 220. The touch chip determines a touch event according to the touch driving signals and the touch sensing signals.

In the embodiment of the present disclosure, each column of the first touch electrode 210 includes multiple first electrode blocks 211 electrically connected to each other. Each row of the second touch electrode 220 includes multiple second electrode blocks 221 electrically connected to each other. In the first direction Y, the first electrode blocks 211 and the second electrode blocks 221 are alternately arranged. In each column of the first touch electrode 210, one second electrode block 221 is provided between two adjacent first electrode blocks 211. There is space in the left and right sides of two adjacent first electrode blocks 211, such that two adjacent first electrode blocks 211 can be electrically connected by using the space on the left side, or two adjacent first electrode blocks 211 can be electrically connected by using the space on the right side, or two adjacent first electrode blocks 211 can be electrically connected by using the spaces on the left and right sides. In the related art, in each column of the touch driving electrode 110, the left and right sides of two adjacent touch driving electrode blocks 111 are respectively provided with one touch sensing electrode block 121, and there is substantially no space in the left and right sides of two adjacent touch driving electrode blocks 111, such that the two adjacent touch driving electrode blocks 111 cannot be electrically connected by using the space on the left or right side. Compared with the related art, in the embodiment of the present disclosure, in each column of the first touch electrode 210, two adjacent first electrode blocks 211 may be electrically connected by using space on the left side and/or the right side, such that the pattern design of the first touch electrode 210 is relatively flexible.

As shown in FIG. 2, the first touch electrode 210 further includes multiple first connection lines 212. In one column of the first touch electrode 210, adjacent first and second ones of the first electrode blocks 211 are electrically connected by a first one of the first connection lines 212 and a second one of the first connection lines 212, and the first one of the first connection lines 212 and the second one of the first connection lines 212 are located on two sides of the second electrode block 221 located between the first one of the first electrode blocks 211 and the second one of the first electrode blocks 211.

In the embodiment of the present disclosure, in one column of the first touch electrode 210, the adjacent first and second ones of the first electrode blocks 211 are electrically connected by the first one of the first connection lines 212 and the second one of the first connection lines 212, instead of being electrically connected by one first connection line 212. The parallel resistance of the first one of the first connection lines 212 and the second one of the first connection lines 212 is smaller than the resistance of one first connection line 212, and the signal attenuation between the first one of the first electrode blocks 211 and the second one of the first electrode blocks 211 is reduced, such that the touch driving signals in one column of the first touch electrode 210 are relatively uniform.

As shown in FIG. 2, the second touch electrode 220 further includes multiple second connection lines 222. In one row of the second touch electrode 220, the adjacent first and second ones of the second electrode blocks 221 are electrically connected by one of the second connection lines 222, and the one of the second connection lines 222 crosses at least one of the first connection lines 212 between the first one of the second electrode blocks 221 and the second one of the second electrode blocks 221.

In the embodiment of the present disclosure, two adjacent second electrode blocks 221 in one row of the second touch electrode 220 are electrically connected by the second connection line 222. Two adjacent first electrode blocks 211 in one column of the first touch electrode 210 are electrically connected by the first connection line 212. The second connection line 222 between the two adjacent second electrode blocks 221 in one row of the second touch electrode 220 crosses the first connection line 212 between the two adjacent first electrode blocks 211 in one column of the first touch electrode 210. One column of the first touch electrode 210 intersects with one row of the second touch electrode 220 to form a mutual capacitance.

Figure 3A:
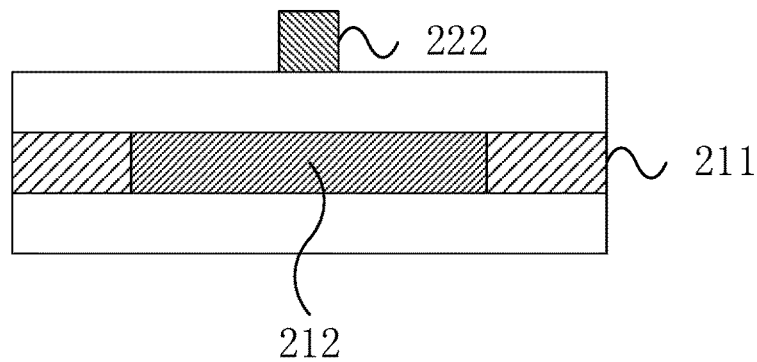
FIG. 3A illustrates a structural schematic diagram of a first connection line 212 of the touch display panel 200 according to an embodiment of the present disclosure.
Figure 3B:
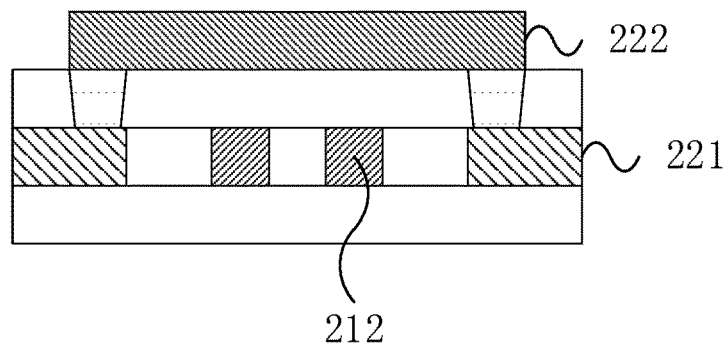
FIG. 3B illustrates a structural schematic diagram of a second connection line 222 of the touch display panel 200 according to an embodiment of the present disclosure.

FIG. 3A illustrates a structural schematic diagram of the first connection line 212 of the touch display panel 200 according to an embodiment of the present disclosure, and FIG. 3B illustrates a structural schematic diagram of the second connection line 222 of the touch display panel 200 according to the embodiment of the present disclosure.

As shown in FIG. 3A and FIG. 3B, in one embodiment of the present disclosure, the first connection line 212 and the second connection line 222 are two conductive wires. The first connection line 212 and the first electrode block 211 are located in the same film layer and directly electrically connected to each other. The second connection line 222 and the second electrode block 221 are located in different film layers and electrically connected by a via hole. The first connection line 212 and the second connection line 222 are located in different film layers and one of them crosses the other one.

Figure 4A:
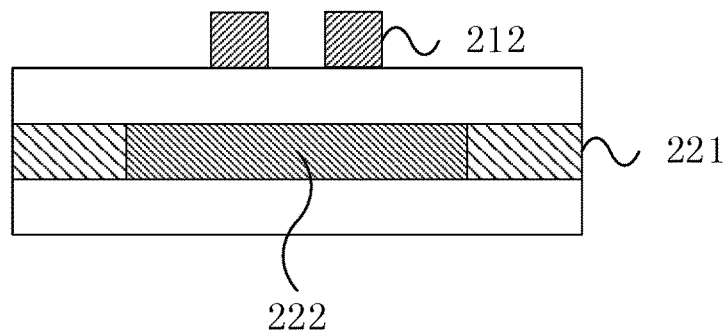
FIG. 4A illustrates another structural schematic diagram of the first connection line 212 of the touch display panel 200 according to an embodiment of the present disclosure.
Figure 4B:
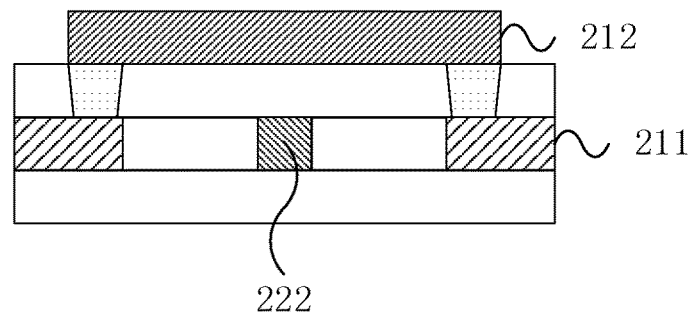
FIG. 4B illustrates another structural schematic diagram of the second connection line 222 of the touch display panel 200 according to an embodiment of the present disclosure.

FIG. 4A illustrates another structural schematic diagram of the first connection line 212 of the touch display panel 200 according to the embodiment of the present disclosure, and FIG. 4B illustrates another structural schematic diagram of the second connection line 222 of the touch display panel 200 according to the embodiment of the present disclosure.

As shown in FIG. 4A and FIG. 4B, in another embodiment of the present disclosure, the first connection line 212 and the second connection line 222 are two conductive wires. The second connection line 222 and the second electrode block 221 are located on the same film layer and directly electrically connected. The first connection line 212 and the first electrode block 211 are located on different film layers and electrically connected by a via hole. The first connection line 212 and the second connection line 222 are located on different film layers and one of them crosses the other.

Figure 5A:
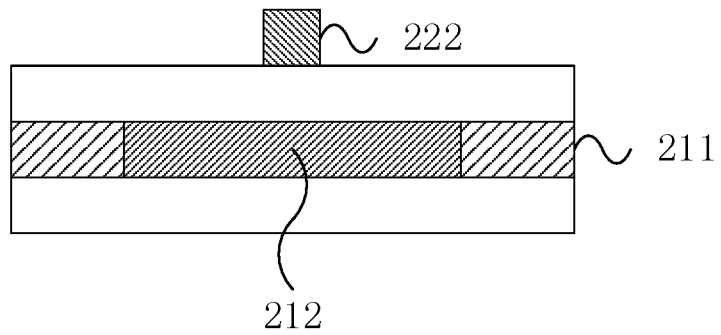
FIG. 5A illustrates another structural schematic diagram of the first connection line 212 of the touch display panel 200 according to an embodiment of the present disclosure.
Figure 5B:
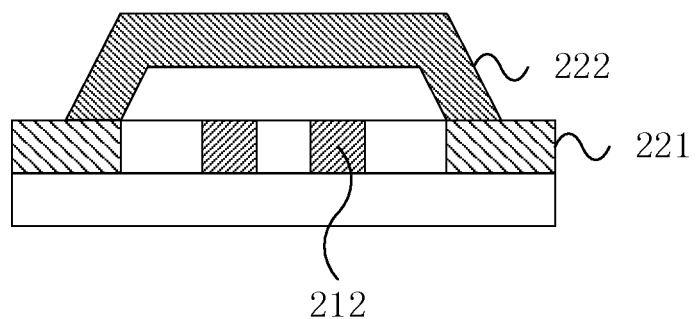
FIG. 5B illustrates another structural schematic diagram of the second connection line 222 of the touch display panel 200 according to an embodiment of the present disclosure.

FIG. 5A illustrates another structural schematic diagram of the first connection line 212 of the touch display panel 200 according to an embodiment of the present disclosure, and FIG. 5B illustrates another structural schematic diagram of the second connection line 222 of the touch display panel 200 according to the embodiment of the present disclosure.

As shown in FIG. 5A and FIG. 5B, in one embodiment of the present disclosure, one of the first connection line 212 and the second connection line 222 is a conductive bridge. For example, the second connection line 222 is a conductive bridge, located at one side of the second electrode block 221 and directly electrically connected thereto, and the first connection line 212 and the first electrode block 211 are located in the same film layer and directly electrically connected, and the first connection line 212 is located on one side of the second connection line 222 and one of them crosses the other one.

Figure 6A:
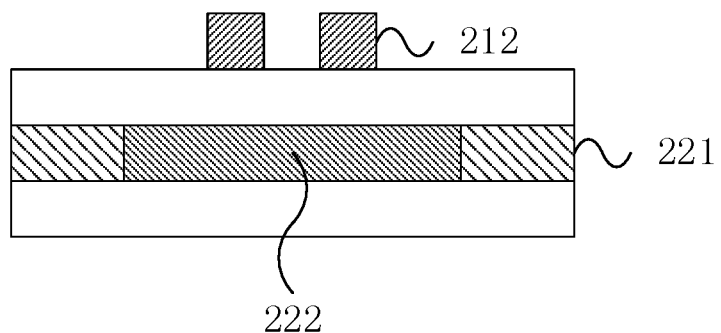
FIG. 6A illustrates another structural schematic diagram of the first connection line 212 of the touch display panel 200 according to an embodiment of the present disclosure.
Figure 6B:
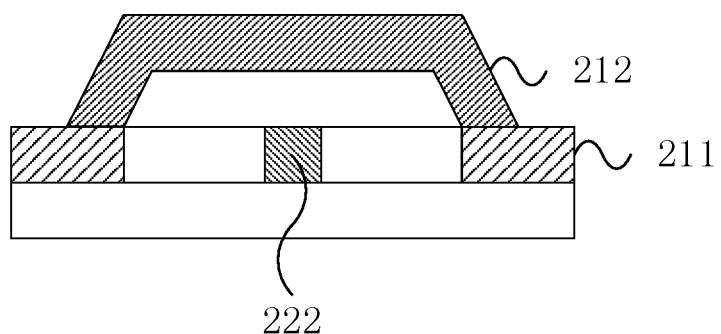
FIG. 6B illustrates another structural schematic diagram of the second connection line 222 of the touch display panel 200 according to an embodiment of the present disclosure.

FIG. 6A illustrates another structural schematic diagram of the first connection line 212 of the touch display panel 200 according to the embodiment of the present disclosure, and FIG. 6B illustrates another structural schematic diagram of the second connection line 222 of the touch display panel 200 according to the embodiment of the present disclosure.

As shown in FIG. 6A and FIG. 6B, in another embodiment of the present disclosure, one of the first connection line 212 and the second connection line 222 is a conductive bridge. For example, the first connection line 212 is a conductive bridge, located at one side of the first electrode block 211 and directly electrically connected thereto, and the second connection line 222 and the second electrode block 221 are located in the same film layer and directly electrically connected, and the first connection line 212 is located on one side of the second connection line 222 and one of them crosses the other one.

As shown in FIG. 2, a dimension S1 of the first electrode block 211 in the second direction X is larger than a dimension S2 of the second electrode block 221 in the second direction X.

In the embodiment of the present disclosure, in one column of the first touch electrode 210, a first one of the second electrode blocks 221 is provided between the adjacent first and second ones of the first electrode blocks 211, and the dimension S1 of the first electrode block 211 in the second direction X is greater than the dimension S2 of the second electrode block 221 in the second direction X; at the left end of one column of the first touch electrode 210, the left end of the first one of the first electrode blocks 211 is located on the left side of the first one of the second electrode blocks 221, and the left end of the second one of the first electrode blocks 211 is located on the left side of the first one of the second electrode blocks 221, and the first one of the first connection lines 212 is provided in the space between the left end of the first one of the first electrode blocks 211 and the left end of the second one of the first electrode blocks 211; at the right end of one column of the first touch electrode 210, the right end of the first one of the first electrode blocks 211 is located on the right side of the first one of the second electrode blocks 221 and the right end of the second one of the first electrode blocks 211 is located on the right side of the first one of the second electrode blocks 221, the second one of the first connection lines 212 is provided in the space between the right end of the first one of the first electrode blocks 211 and the right end of the second one of the first electrode blocks 211; the left end of the first one of the first electrode blocks 211 and the left end of the second one of the first electrode blocks 211 are electrically connected by the first one of the first connection lines 212, and the right end of the first one of the first electrode blocks 211 and the right end of the second one of the first electrode blocks 211 are electrically connected by the second one of the first connection lines 212. The connection resistance between the first one of the first electrode blocks 211 and the second one of the first electrode blocks 211 becomes smaller, the signal attenuation between the first one of the first electrode blocks 211 and the second one of the first electrode blocks 211 is reduced, and the touch driving signals in one column of the first touch electrode 210 are relatively uniform.

As shown in FIG. 2, the first electrode block 211 has a first end and a second end opposite in the second direction X; in one column of the first touch electrode 210, a distance D1 between the first ends or the second ends of two adjacent first electrode blocks 211 is smaller than the dimension S3 of the second electrode block 221 in the first direction Y.

In the embodiment of the present disclosure, the first end of the first electrode block 211 is the left end of the first electrode block 211, and the second end of the first electrode block 211 is the right end of the first electrode block 211; in one column of the first touch electrode 210, a first one of the second electrode blocks 221 is provided between the adjacent first and second ones of the first electrode blocks 211, a distance between the left end of the first one of the first electrode blocks 211 and the left end of the second one of the first electrode blocks 211 is smaller than a dimension S3 of the first one of the second electrode blocks 221 in the first direction Y, a distance between the right end of the first one of the first electrode blocks 211 and the right end of the second one of the first electrode blocks 211 is smaller than the dimension S3 of the first one of the second electrode blocks 221 in the first direction Y, the left end of the first one of the first electrode blocks 211 and the left end of the second one of the first electrode blocks 211 extend to the left side of the first one of the second electrode blocks 221, the right end of the first one of the first electrode blocks 211 and the right end of the second one of the first electrode blocks 211 extend to the right side of the first one of the second electrode blocks 221, a shorter first connection line 212 is provided between the left end of the first one of the first electrode blocks 211 and the left end of the second one of the first electrode blocks 211, and a shorter first connection line 212 is provided between the right end of the first one of the first electrode blocks 211 and the right end of the second one of the first electrode blocks 211. The connection resistance between the first one of the first electrode blocks 211 and the second one of the first electrode blocks 211 becomes smaller, the signal attenuation between the first one of the first electrode blocks 211 and the second one of the first electrode blocks 211 is reduced, and the touch driving signals in one column of the first touch electrode 210 are relatively uniform.

As shown in FIG. 2, a ratio of an area of the first electrode block 211 to an area of the second electrode block 221 is greater than or equal to 0.99 and smaller than or equal to 1.01.

In the embodiment of the present disclosure, the first electrode block 211 in the first touch electrode 210 has a touch driving signal, and the second electrode block 221 in the second touch electrode 220 has a touch sensing signal. In one aspect, the ratio of the area of the first electrode block 211 to the area of the second electrode block 221 is greater than or equal to 0.99, so as prevent the first electrode block 211 from being too small, which would otherwise cause the touch driving signal to be seriously attenuated. In another aspect, the ratio of the area of the first electrode block 211 to the area of the second electrode block 221 is smaller than or equal to 1.01, so as to prevent the second electrode block 221 from being too small, which would otherwise cause the touch driving signal to be seriously attenuated.

Figure 7:
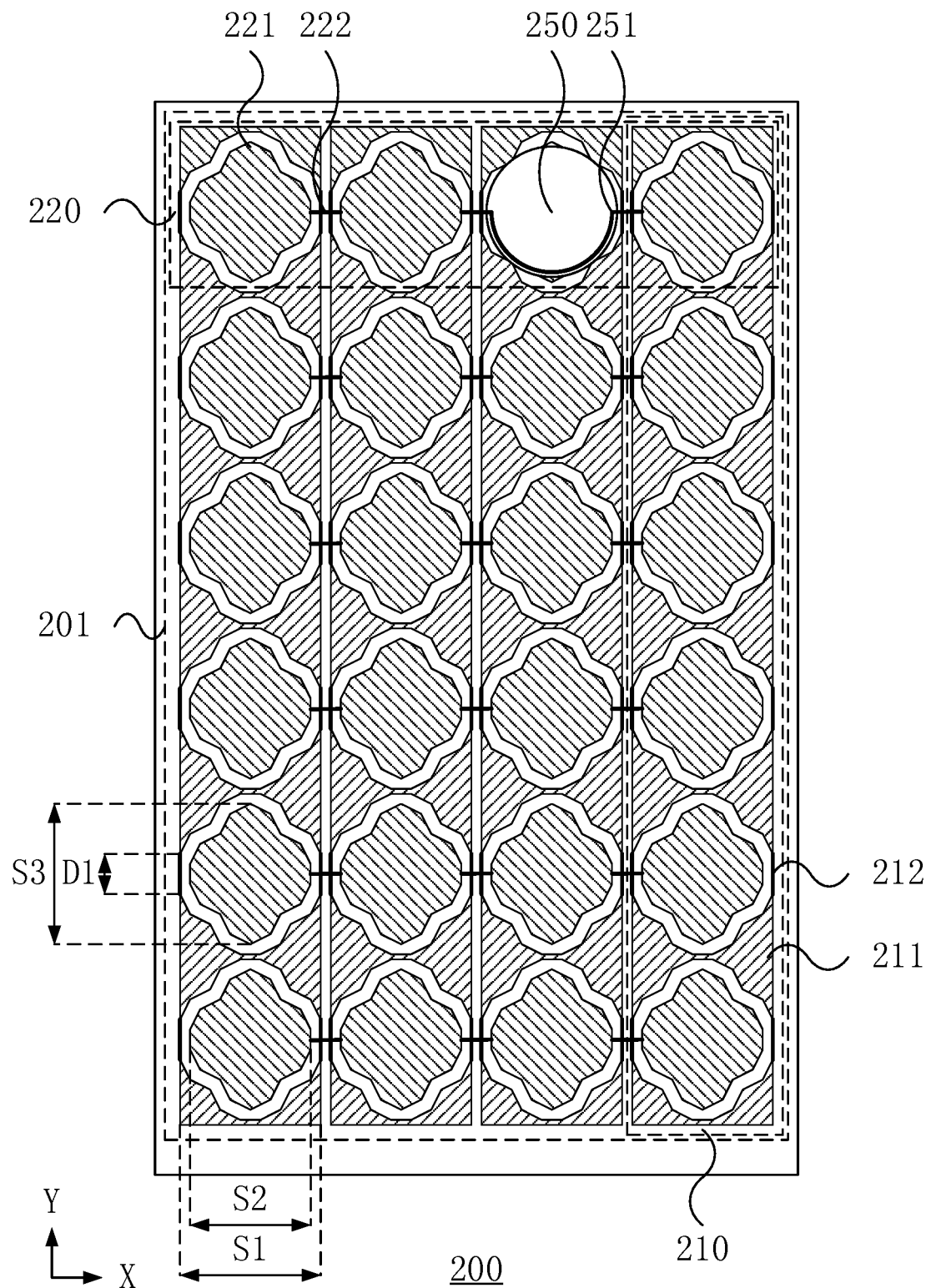
FIG. 7 illustrates another structural schematic diagram of the touch display panel 200 according to an embodiment of the present disclosure.

FIG. 7 illustrates another structural schematic diagram of the touch display panel 200 according to the embodiment of the present disclosure.

As shown in FIG. 7, the first touch display region 201 is provided with an opening 250, and the opening 250 is located between two ends of one row of the second touch electrode 220 that are opposite in the first direction Y.

In the embodiment of the present disclosure, the first touch display region 201 is provided with the opening 250. The opening 250 is used to receive one or more of an earpiece, a camera, a light sensor, a distance sensor, an iris recognition sensor and a fingerprint recognition sensor. The opening 250 can be a blind hole or a through hole. The opening 250 in a form of the blind hole penetrates partial film layers of the touch display panel 200. A glass cover of the touch display panel 200 can be retained on the opening 250 in the form of the blind hole, and a touch connection line can be provided on the glass cover. The opening 250 in a form of the through hole penetrates through all the film layers of the touch display panel 200. A frame region may be provided around the opening 250 in the form of the through hole, and a touch connection line may be provided in the frame region. Two ends of one row of the second touch electrode 220 opposite in the first direction Y are the upper and lower ends of the row of the second touch electrode 220, and the opening 250 is located between the upper and lower ends of the row of the second touch electrode 220, instead of crossing multiple rows of the second touch electrodes 220. The opening 250 interrupts a single row of the second touch electrode 220, without interrupting multiple rows of the second touch electrodes 220, such that the effect of the opening 250 on the second touch electrode 220 is reduced.

As shown in FIG. 7, the opening 250 is located between two opposite ends of one column of the first touch electrode 210 in the second direction X.

In the embodiment of the present disclosure, the two opposite ends of one column of the first touch electrode 210 in the second direction X are the left and right ends of the column of the first touch electrode 210. The opening 250 is located between the left and right ends of the column of the first touch electrode 210. The opening 250 does not interrupt the left and right ends of this column of the first touch electrode 210. At the left end of this column of the first touch electrode 210, the left ends of two adjacent first electrode blocks 211 are electrically connected by one first connection line 212. At the right end of this column of the first touch electrode 210, the right ends of the two adjacent first electrode blocks 211 are electrically connected by one first connection line 212. Therefore, this column of the first touch electrode 210 is completely conductive.

Figure 8:
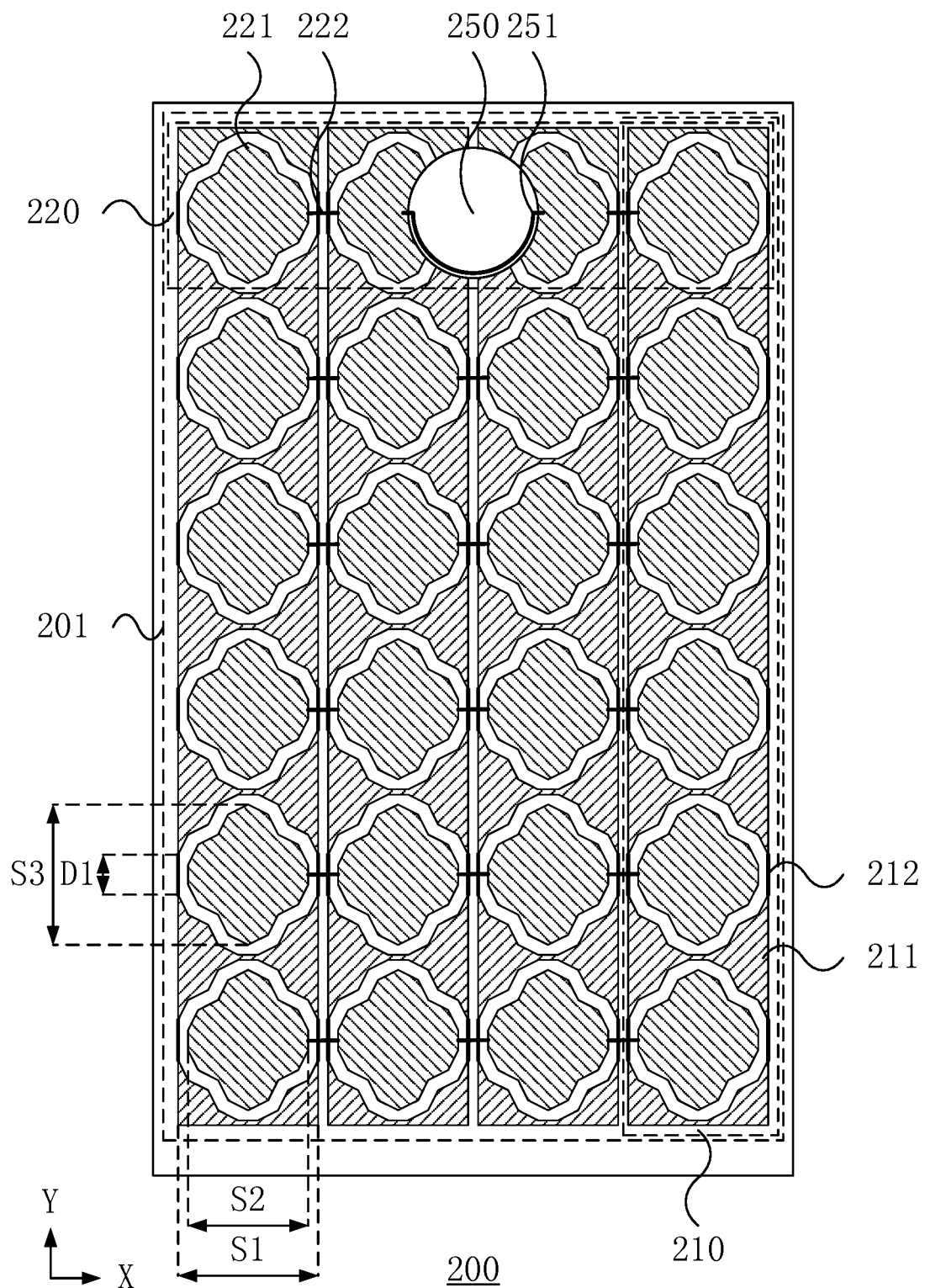
FIG. 8 illustrates another structural schematic diagram of the touch display panel 200 according to an embodiment of the present disclosure.

FIG. 8 illustrates another structural schematic diagram of the touch display panel 200 according to the embodiment of the present disclosure.

As shown in FIG. 8, the opening 250 is located between the first column of the first touch electrode 210 and the second column of the first touch electrode 210 that are adjacent.

In the embodiment of the present disclosure, the opening 250 is located between the first column of the first touch electrode 210 and the second column of the first touch electrode 210 that are adjacent. Moreover, the opening 250 is located between the upper end and the lower end of the row of the second touch electrode 220. The first column of the first touch electrode 210 is located on the left side, and the second column of the first touch electrode 210 is located on the right side. The opening 250 interrupts the right end of the first column of the first touch electrode 210 without interrupting the left end of the first column of the first touch electrode 210. The opening 250 interrupts the left end of the second column of the first touch electrode 210 without interrupting the right end of the second column of the first touch electrode 210. At the left end of the first column of the first touch electrode 210, left ends of two adjacent first electrode blocks 211 are electrically connected by the first connection line 212, such that the first column of the first touch electrode 210 is completely conductive. At the right end of the second column of the first touch electrode 210, right ends of two adjacent first electrode blocks 211 are electrically connected by the first connection line 212, such that the second column of the first touch electrode 210 is completely conductive.

As shown in FIG. 7 and FIG. 8, the opening 250 is provided with one touch connection line 251, and the row of the second touch electrode 220 where the opening 250 is located is conductive by the touch connection line 251.

As shown in FIG. 7 and FIG. 8, in one embodiment of the present disclosure, the opening 250 can be in a form of a blind hole. The opening 250 in the form of the blind hole penetrates partial film layers of the touch display panel 200. A glass cover of the touch display panel 200 can be retained on the opening 250 in the form of the blind hole, and a touch connection line 251 can be provided on the glass cover.

In another embodiment of the present disclosure, the opening 250 can be in a form of a through hole, and the opening 250 of the through hole penetrates through all the layers of the touch display panel 200. A frame region may be provided around the opening 250 of the through hole, and a touch connection line 251 may be provided in the frame region.

In the embodiment of the present disclosure, the opening 250 is in one row of the second touch electrode 220. The opening 250 interrupts this row of the second touch electrode 220, and the row of the second touch electrode 220 is divided into a left half and a right half. The opening 250 is provided with the touch connection line 251. The left and right halves of this row of the second touch electrode 220 are electrically connected by the touch connection line 251, and this row of the second touch electrode 220 is conductive by the touch connection line 251. The opening 250 is located in one column of the first touch electrode 210 or between two adjacent columns of the first touch electrodes 210, and the opening 250 does not interrupt this column of first touch electrode 210 or these two columns of first touch electrodes 210, such that this column of the first touch electrode 210 or these two columns of the first touch electrodes 210 do not need to be conductive by the touch connection line 251. The opening 250 is provided with one touch connection line 251, instead of being provided with multiple touch connection lines 251, thereby preventing crosstalk of the touch connection lines 251 and improving the signal of the touch connection line 251.

As shown in FIG. 7 and FIG. 8, the touch connection line 251 has a greater resistivity than the second connection line 222.

In the embodiment of the present disclosure, the opening 250 is in one row of the second touch electrode 220. A length of this row of the second touch electrode 220 in the second direction X is smaller than a length of another row of the second touch electrode 220 in the second direction X, and a resistance of this row of the second touch electrode 220 is smaller than a resistance of another row of the second touch electrode 220. This row of the second touch electrode 220 is conductive by the touch connection line 251. The resistivity of the touch connection line 251 is greater than the resistivity of the second connection line 222. A sum of the resistance of this row of the second touch electrode 220 and the resistance of the touch connection lines 251 is equal to the resistance of another row of the second touch electrode 220. The touch control performance of each row of the second touch electrode 220 is uniform.

Figure 9:
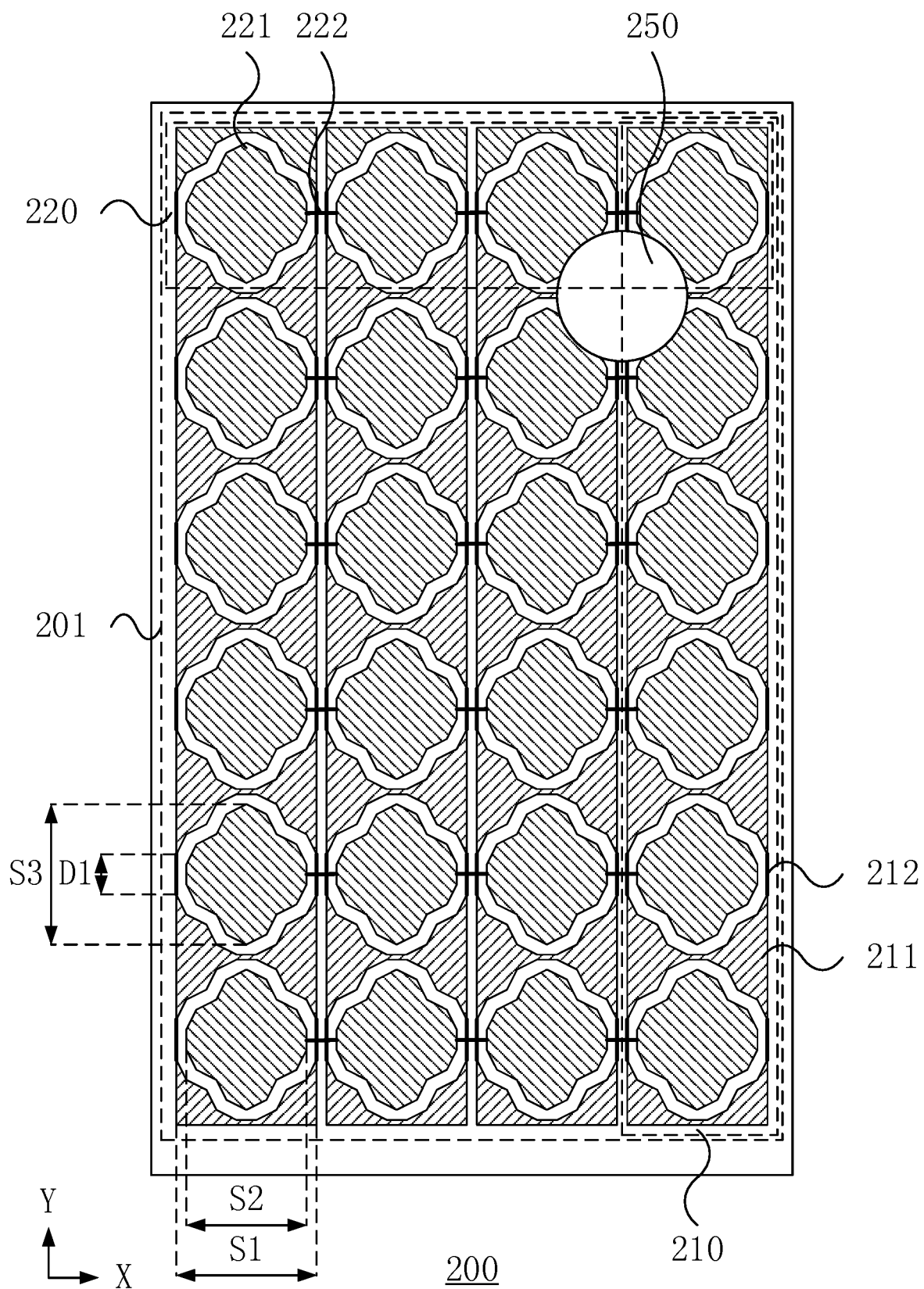
FIG. 9 illustrates another structural schematic diagram of the touch display panel 200 according to an embodiment of the present disclosure.

FIG. 9 illustrates another structural schematic diagram of the touch display panel 200 according to the embodiment of the present disclosure.

As shown in FIG. 9, the first touch display region 201 is provided with an opening 250. The opening 250 is located between two first electrode blocks 211 that are adjacent and connected and between two second electrode blocks 221 that are adjacent and connected, without interrupting any of the first touch electrodes 210 and the second touch electrodes 220.

In the embodiment of the present disclosure, the opening 250 is located between two first electrode blocks 211 that are adjacent and connected, without interrupting any of the first touch electrodes 210, so that each of the first touch electrodes 210 is completely conductive. The opening 250 is located between two second electrode blocks 221 that are adjacent and connected, without interrupting any of the second touch electrodes 220, so that each of the second touch electrodes 220 is completely conductive. The opening 250 does not need to be provided with a touch connection line 251. The opening 250 is fully adapted to receive one or more of an earpiece, a camera, a light sensor, a distance sensor, an iris recognition sensor and a fingerprint recognition sensor.

As shown in FIGS. 2 and 7 to 9, the first touch electrode 210 is used as a touch driving electrode and the second touch electrode 220 is used as a touch sensing electrode.

In an embodiment of the present disclosure, in the first touch display region 201, the first touch electrode 210 is used as a touch driving electrode. The first touch electrode 210 is electrically connected to the touch chip, and the touch chip transmits a touch driving signal to the first touch electrode 210. The second touch electrode 220 is used as a touch sensing electrode. The second touch electrode 220 is electrically connected to the touch chip, and the touch chip detects a touch sensing signal of the second touch electrode 220 to determine a touch event. The first touch display region 201 can be provided with an opening 250. For example, the opening 250 is located between the upper end and the lower end of one row of the second touch electrode 220, or located between the left end and the right end of one column of the first touch electrode 210, or located between the first column of the first touch electrode 210 and the second column of the first touch electrode 210 that are adjacent, or located between two first electrode blocks 211 that are adjacent and connected and between two second electrode blocks 221 that are adjacent and connected. That is, the arrangement of the opening 250 is relatively flexible. Moreover, the opening 250 is provided with at most one touch connection line 251 instead of being provided with multiple touch connection lines 251, such that the crosstalk of touch connection lines 251 can be avoided and the signal of the touch connection line 251 can be improved.

Figure 10:
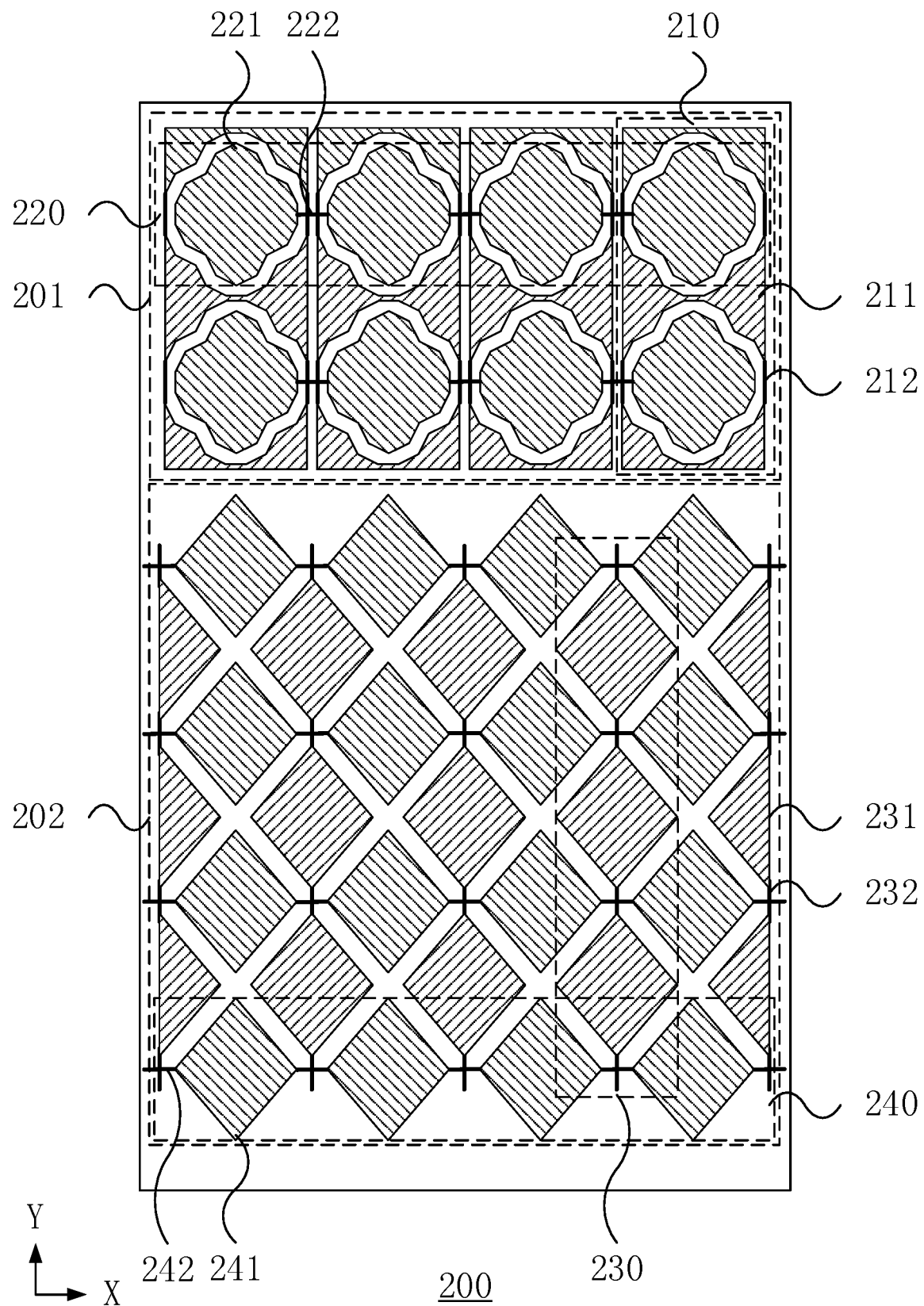
FIG. 10 illustrates another structural schematic diagram of the touch display panel 200 according to an embodiment of the present disclosure.

FIG. 10 illustrates another structural schematic diagram of the touch display panel 200 according to the embodiment of the present disclosure.

As shown in FIG. 10, the touch display panel 200 further includes a second touch display region 202. The second touch display region 202 includes multiple columns of third touch electrodes 230 extending in the first direction Y and arranged in the second direction X. Each column of the third touch electrode 230 includes multiple third electrode blocks 231 and multiple third connection lines 232. Two adjacent third electrode blocks 231 in one column of the third touch electrode 230 are electrically connected by one third connection line 232. The second touch display region 202 further includes multiple rows of fourth touch electrodes 240 extending in the second direction X and arranged in the first direction Y. Each row of the fourth touch electrode 240 includes multiple fourth electrode blocks 241 and multiple fourth connection lines 242. Two adjacent fourth electrode blocks 241 in one row of the fourth touch electrode 240 are electrically connected by one fourth connection line 242.

In the embodiment of the present disclosure, the touch display panel 200 includes a first touch display region 201 and a second touch display region 202. In the first touch display region 201, the first touch electrode 210 is used as a touch driving electrode, and in each column of the first touch electrode 210, two adjacent first electrode blocks 211 can be electrically connected by using space on the left side and/or the right side, such that the pattern design of the first touch electrode 210 is relatively flexible. In the second touch display region 202, the third touch electrode 230 is used as a touch driving electrode, and in each column of the third touch electrode 230, two adjacent third electrode blocks 231 are electrically connected by one third connection line 232, such that the connection lines in the third touch electrodes 230 are simplified.

As shown in FIG. 10, the third touch electrode 230 is used as a touch driving electrode and the fourth touch electrode 240 is used as a touch sensing electrode.

In the embodiment of the present disclosure, the touch display panel 200 includes the second touch display region 202. In the second touch display region 202, the third touch electrode 230 is used as a touch driving electrode. The third touch electrode 230 is electrically connected to the touch chip, and the touch chip transmits a touch driving signal to the third touch electrode 230. The fourth touch electrode 240 is used as a touch sensing electrode. The fourth touch electrode 240 is electrically connected to the touch chip, and the touch chip detects a touch sensing signal of the fourth touch electrode 240 to determine a touch event. The touch display panel 200 includes the first touch display region 201, and the first touch display region 201 can be provided with the opening 250. For example, the opening 250 is located between the upper end and the lower end of one row of the second touch electrode 220, or located between the left end and the right end of one column of the first touch electrode 210, or located between the first column of the first touch electrode 210 and the second column of the first touch electrode 210 that are adjacent, or located between two first electrode blocks 211 that are adjacent and connected and between two second electrode blocks 221 that are adjacent and connected. That is, the arrangement of the opening 250 is relatively flexible. Moreover, the opening 250 is provided with at most one touch connection line 251 instead of being provided with multiple touch connection lines 251, such that the crosstalk of the touch connection lines 251 can be avoided and the signal of the touch connection lines 251 can be improved.

Figure 11:
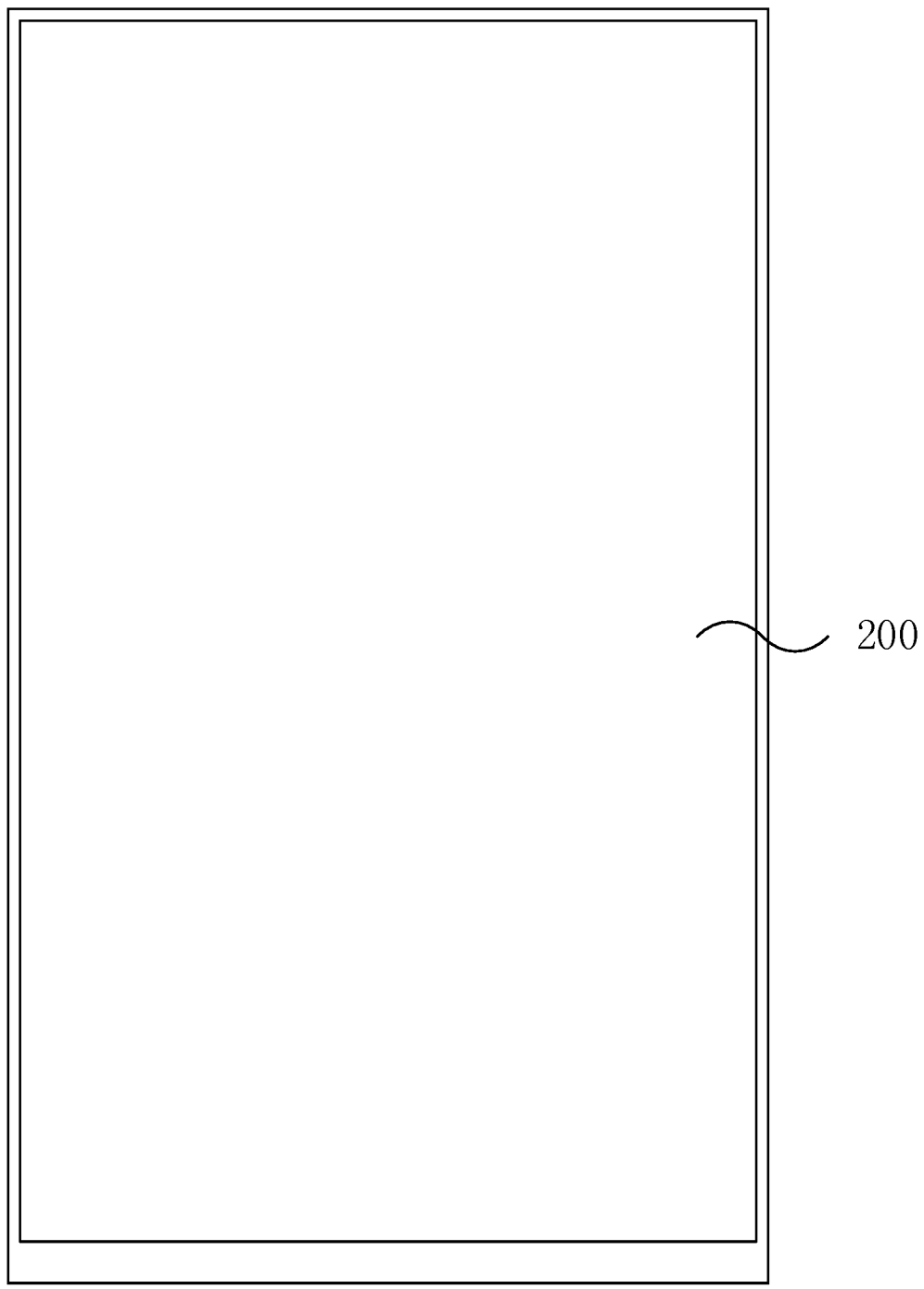
FIG. 11 illustrates a structural schematic diagram of a touch display device 300 according to an embodiment of the present disclosure.

FIG. 11 illustrates a structural schematic diagram of a touch display device 300 according to an embodiment of the present disclosure.

As shown in FIG. 11, the touch display device 300 includes the touch display panel 200.

In the embodiment of the present disclosure, the touch display device 300 implements a touch display function by using the touch display panel 200, such as a smart phone, a tablet computer, or other devices for display and touch. The touch display panel 200 is as described above and will not be described again.

In summary, the present disclosure provides a touch display panel and a touch display device. The touch display panel includes a first touch display region. The first touch display region includes first touch electrodes arranged in multiple columns, extending in a first direction and arranged in a second direction, each column of the first touch electrode including multiple first electrode blocks electrically connected to each other and the first direction intersecting the second direction; second touch electrodes arranged in multiple rows, extending in the second direction and arranged in the first direction, each second touch electrode including multiple second electrode blocks electrically connected to each other. The first electrode blocks and the second electrode blocks are alternately arranged in the first direction. In the present disclosure, in each column of the first touch electrode, two adjacent first electrode blocks can be electrically connected by using the space on the left side, or two adjacent first electrode blocks can be electrically connected by using the space on the right side, or two adjacent first electrode blocks can be electrically connected by using spaces on the left side and the right side, such that the pattern design of the first touch electrodes is relatively flexible.

The above are only the preferred embodiments of the present disclosure and are not intended to limit the present disclosure. Any modifications, equivalents, improvements, etc., which are made within the spirit and principles of the present disclosure, should be included in the scope of the present disclosure.

What is claimed is:

1. A touch display panel, the touch display panel having a first touch display region, the touch display panel comprising:
    first touch electrodes arranged in a plurality of columns in the first touch display region, the first touch electrodes extending in a first direction and being arranged in a second direction, each of the first touch electrodes comprising a plurality of first electrode blocks electrically connected to each other, and the first direction intersecting the second direction; and
    second touch electrodes arranged in a plurality of rows in the first touch display region, the second touch electrodes extending in the second direction and arranged in the first direction, each of the second touch electrodes comprising a plurality of second electrode blocks electrically connected to each other,
    wherein the plurality of first electrode blocks and the plurality of second electrode blocks are alternately arranged in the first direction, and
    wherein the first touch electrodes further comprise a plurality of first connection lines, in one of the first touch electrodes, a first one of the plurality of first electrode blocks and an adjacent second one of the plurality of first electrode blocks are electrically connected by a first one of the plurality of first connection lines and a second one of the plurality of first connection lines, and the first one of the plurality of first connection lines and the second one of the plurality of first connection lines are located on two sides of one of the plurality of second electrode blocks located between the first one of the plurality of first electrode blocks and the second one of the plurality of first electrode blocks.

2. The touch display panel according to claim 1, wherein the second touch electrodes further comprise a plurality of second connection lines; in one of the second touch electrodes, a first one of the plurality of second electrode blocks and a second one of the plurality of second electrode blocks, which are adjacent, are electrically connected by one of the plurality of second connection lines, and the one of the plurality of second connection lines crosses at least one of the plurality of first connection lines located between the first one of the plurality of second electrode blocks and the second one of the plurality of second electrode blocks.

3. The touch display panel according to claim 2, wherein an opening is provided in the first touch display region, and the opening is located between two opposite ends of one of the second touch electrodes in the first direction.

4. The touch display panel according to claim 3, wherein the opening is located between two opposite ends of one of the first touch electrodes in the second direction.

5. The touch display panel according to claim 3, wherein the opening is located between a first one of the first touch electrodes and a second one of the first touch electrodes, the first one and the second one being adjacent.

6. The touch display panel according to claim 3, wherein the opening is provided with one touch connection line, and one of the second touch electrodes in which the opening is located is conductive through the touch connection line.

7. The touch display panel according to claim 6, wherein the touch connection line has a greater resistivity than each of the plurality of second connection lines.

8. The touch display panel according to claim 3, wherein the touch display panel further has a second touch display region, and the touch display panel further comprises:
   third touch electrodes arranged in a plurality of columns in the second touch display region, the third touch electrodes extending in the first direction and arranged in the second direction, each of the third touch electrodes comprising a plurality of third electrode blocks and a plurality of third connection lines, two adjacent third electrode blocks in one of the third touch electrodes being electrically connected by one of the plurality of third connection lines; and
   fourth touch electrodes arranged in a plurality of rows in the second touch display region, the fourth touch electrodes extending in the second direction and arranged in the first direction, each of the fourth touch electrodes comprising a plurality of fourth electrode blocks and a plurality of fourth connection lines, two adjacent fourth electrode blocks in one of the fourth touch electrodes being electrically connected by one of the plurality of fourth connection lines.

9. The touch display panel according to claim 8, wherein each of the third touch electrodes is used as a touch driving electrode and each of the fourth touch electrodes is used as a touch sensing electrode.

10. The touch display panel according to claim 2, wherein an opening is provided in the first touch display region, and the opening is located between two of the plurality of first electrode blocks that are adjacent and connected to each other and between two of the plurality of second electrode blocks that are adjacent and connected to each other, without interrupting any of the first touch electrodes and any of the second touch electrodes.

11. The touch display panel according to claim 1, wherein a dimension of each of the plurality of first electrode blocks in the second direction is greater than a dimension of each of the plurality of second electrode blocks in the second direction.

12. The touch display panel according to claim 1, wherein each of the plurality of first electrode blocks has a first end and a second end opposite to each other in the second direction; and in one of the first touch electrodes, a distance between the first ends or the second ends of two adjacent first electrode blocks of the plurality of first electrode blocks is smaller than a dimension of each of the plurality of second electrode blocks in the first direction.

13. The touch display panel according to claim 1, wherein a ratio of an area of each of the plurality of first electrode blocks to an area of each of the plurality of second electrode blocks is greater than or equal to 0.99 and smaller than or equal to 1.01.

14. The touch display panel of claim 1, wherein each first touch electrode in the first touch electrodes is used as a touch driving electrode and each second touch electrode in the second touch electrodes is used as a touch sensing electrode.

15. A touch display device, comprising a touch display panel, wherein the touch display panel has a first touch display region, the touch display panel comprising:
   first touch electrodes arranged in a plurality of columns in the first touch display region, the first touch electrodes extending in a first direction and being arranged in a second direction, each of the first touch electrodes comprising a plurality of first electrode blocks electrically connected to each other, and the first direction intersecting the second direction; and
   second touch electrodes arranged in a plurality of rows in the first touch display region, the second touch electrodes extending in the second direction and arranged in the first direction, each of the second touch electrodes comprising a plurality of second electrode blocks electrically connected to each other,
   wherein the plurality of first electrode blocks and the plurality of second electrode blocks are alternately arranged in the first direction, and
   wherein the first touch electrodes further comprise a plurality of first connection lines; in one of the first touch electrodes, a first one of the plurality of first electrode blocks and an adjacent second one of the plurality of first electrode blocks are electrically connected by a first one of the plurality of first connection lines and a second one of the plurality of first connection lines, and the first one of the plurality of first connection lines and the second one of the plurality of first connection lines are located on two sides of one of the plurality of second electrode blocks located between the first one of the plurality of first electrode blocks and the second one of the plurality of first electrode blocks.

16. The touch display device according to claim 15, wherein the second touch electrodes further comprise a plurality of second connection lines; in one of the second touch electrodes, a first one of the plurality of second electrode blocks and a second one of the plurality of second electrode blocks, which are adjacent, are electrically connected by one of the plurality of second connection lines, and the one of the plurality of second connection lines crosses at least one of the plurality of first connection lines located between the first one of the plurality of second electrode blocks and the second one of the plurality of second electrode blocks.

17. The touch display device according to claim 15, wherein a dimension of each of the plurality of first electrode blocks in the second direction is greater than a dimension of each of the plurality of second electrode blocks in the second direction.

18. The touch display device according to claim 15, wherein each of the plurality of first electrode blocks has a first end and a second end opposite to each other in the second direction; and in one of the first touch electrodes, a distance between the first ends or the second ends of two adjacent first electrode blocks of the plurality of first electrode blocks is smaller than a dimension of each of the plurality of second electrode blocks in the first direction.

* * * * *